United States Patent
Yao et al.

(10) Patent No.: US 7,502,789 B2
(45) Date of Patent: Mar. 10, 2009

(54) IDENTIFYING IMPORTANT NEWS REPORTS FROM NEWS HOME PAGES

(75) Inventors: Jinyi Yao, Beijing (CN); Ming Jing Li, Beijing (CN); Wei-Ying Ma, Beijing (CN); Zhiwei Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 298 days.

(21) Appl. No.: 11/303,443

(22) Filed: Dec. 15, 2005

(65) Prior Publication Data

US 2007/0143279 A1  Jun. 21, 2007

(51) Int. Cl.
*G06F 17/30* (2006.01)
(52) U.S. Cl. ............... 707/7; 707/1; 707/2; 707/3; 707/6; 707/10
(58) Field of Classification Search .......... 707/1–3, 707/6, 7, 9, 10, 100
See application file for complete search history.

(56) References Cited

U.S. PATENT DOCUMENTS

| | | | | |
|---|---|---|---|---|
| 7,260,573 B1 * | 8/2007 | Jeh et al. | ............ | 707/7 |
| 7,356,530 B2 * | 4/2008 | Kim et al. | ............ | 707/7 |
| 2004/0205059 A1 * | 10/2004 | Nishioka et al. | ............ | 707/3 |
| 2006/0039045 A1 * | 2/2006 | Sato et al. | ............ | 358/538 |

OTHER PUBLICATIONS

Kamvar et al, "Exploiting the Block Structure of the Web for Computing PageRank", 2003, Stanford University, 13 pages.*

"2004 Web Usage Survey Results," Sponsored by Cerberian and SonicWall, May 26, 2004, 28 pages, CerberianSonicWallSurveyResultsBooklet_May04.doc.

Allan, James et al., "Topic Detention and Tracking Pilot Study Final Report," In Proceedings of the Broadcast News Understanding and Transcription Workshop, 1998, 25 pages.

Allan, James, Victor Lavrenko and Hubert Jin, "First Story Detection In TDT Is Hard," CIKM 2000, McLean, VA, © 2000 ACM, pp. 374-381.

Broder, Andrei et al., "Graph structure in the web," In the Ninth International WWW Conference, 2000, http://www9.org/w9cdrom/160/160.html [last accessed May 15, 2006].

(Continued)

*Primary Examiner*—Cam-Linh Nguyen
(74) *Attorney, Agent, or Firm*—Perkins Coie LLP

(57) ABSTRACT

A method and system for determining the importance of news events based on news reports published by news sources on news home pages is provided. A news system identifies news home pages that contain references to news reports on detail pages. The news system calculates the importance of a news event based on the importance of news reports reporting that news event. The news system may determine the importance of a news report based on the assumption that the importance of a news report is based on the credibility of news home pages and the importance of similar news reports. The news system may recursively define the importance of a news report based on the credibility of news home pages and the similarity to other news pages and the importance of a news home page based on the importance of its news reports and similar news reports.

24 Claims, 11 Drawing Sheets

OTHER PUBLICATIONS

Cai, Deng, Shipeng Yu, Ji-Rong Wen and Wei-Ying Ma, "VIPS: A VIsion based Page Segmentation Algorithm," Microsoft Technical Report, MSR-TR-2003-79, 2003, pp. 1-32.

Chakrabarti, Soumen et al., "Mining the Web's Link Structure," Computer, Aug. 1999, © 1999 IEEE, pp. 60-67.

Cooley, R., B. Mobasher and J. Srivastava, "Web Mining: Information and Pattern Discovery on the World Wide Web," In the Ninth International Conference on Tools with Artificial Intelligence (ICTAI'97), © 1997 IEEE, pp. 558-567.

Del Corso, Gianna, Antonio Gulli and Francesco Romani, "Ranking a Stream of News," International World Wide Web Conference Committee, WWW 2005, May 10-14, 2005, Chiba, Japan, pp. 97-106.

Kleinberg, Jon M. et al., "The Web as a graph: measurements, models, and methods," In Proc. 5th Int. Computing and Combinatorics, 1999, 18 pages.

Kleinberg, Jon M., "Authoritative Sources in a Hyperlinked Environment," Journal of the ACM, vol. 46, No. 5, Sep. 1999, © 1999 ACM, pp. 604-632.

Kosala, Raymond and Hendrik Blockeel, "Web Mining Research: A Survey," Jul. 2000, SIGKDD Explorations, vol. 2, Issue 1, pp. 1-15.

Macskassy, Sofus A, Haym Hirsh, Foster Provost, Ramesh Sankaranarayanan and Vasant Dhar, "Intelligent Information Triage," SIGIR'01, Sep. 9-12, New Orleans, © 2001 ACM, pp. 318-326.

* cited by examiner

IDENTIFYING IMPORTANT NEWS REPORTS FROM NEWS HOME PAGES

BACKGROUND

One of the most popular uses of the Internet is to search for news reports. One survey conducted in 2004 indicated that 56% of the users listed news as one of the top five reasons for accessing the Internet. As the popularity of using the Internet to review news reports grows, the number of web-based news sources has proliferated. These news sources typically provide a portal or news home page that provides a summary of important news reports along with links to detail pages containing the news reports. Each news report may report one or more news events. For example, one news report may relate a bankruptcy filing of a company, and another news report may relate to a speech made by an elected official. A news home page may contain summaries of news reports at various levels of detail. For example, one or two important news reports may be prominently displayed on a news home page along with a title that serves as a link to a detail page of the news report and a two or three sentence summary of the news report. A news report of lesser importance may be displayed less prominently simply with a title that serves as a link to the detail page of the news report.

Because there are so many available news sources, it can be difficult for a user to identify news reports for important news events. A user could use a search engine service to search for recent news events, but without knowing the specifics of a news event, the user cannot effectively specify a search query for news reports reporting that news event. Moreover, search engine services may not be able to update their search mappings (described below) as quickly as needed to allow users to locate news reports as the news reports are posted by a news source. As a result, many users typically access a single news source (e.g., "MSNBC.com"). Unfortunately, a single news source may not have or prominently display all the news reports of interest to a user. As a result, a user may have no effective way to locate all the news reports of interest.

Using a search engine service, such as Google and Overture, a user may attempt to locate news reports published on display pages, such as web pages, that may be of interest to the user. After the user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on various metrics such as the term frequency and inverse document frequency metric ("tf*idf"). The search engine service may also generate an importance score to indicate the importance of the web page based on various metrics such as Google's PageRank metric. The search engine service then displays to the user links to those web pages in an order that is based on a ranking determined by their relevance and importance.

Two well-known techniques for determining the importance of web pages are PageRank and HITS ("Hyperlink-Induced Topic Search"). PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by matrix A, where $A_{ij}$ represents the number of outgoing links from web page i to web page j. The importance score $w_j$ for web page j can be represented by the following equation:

$$w_j = \Sigma_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the result as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q) \text{ and}$$

$$h(p) = \sum_{p \to q} a(q)$$

where $a(p)$ represents the authority score for web page p and h (p) represents the hub score for web page p. HITS uses an adjacency matrix A to represent the links. The adjacency matrix is represented by the following equation:

$$b_{ij} = \begin{cases} 1 & \text{if page } i \text{ has a link to page } j \\ 0 & \text{otherwise} \end{cases}$$

The vectors $\alpha$ and h correspond to the authority and hub scores, respectively, of all web pages in the set and can be represented by the following equations:

$$\alpha = A^T h \text{ and } h = A\alpha$$

Thus, $\alpha$ and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

SUMMARY

A method and system for determining the importance of news events based on news reports published by news sources on news home pages is provided. A news system identifies news home pages that contain references to news reports on detail pages. The news system calculates the importance of a news event based on the importance of news reports reporting that news event. The news system may determine the importance of a news report based on the assumption that the importance of a news report is based on the credibility of news home pages and the importance of similar news reports. The news system may recursively define the importance of a news report based on the credibility of news home pages and the similarity to other news pages and the importance of a news home page based on the importance of its news reports and similar news reports. The news system may iteratively calculate the importance of the news reports and news home pages and use the importance of the news report to indicate the importance of the reported news events.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
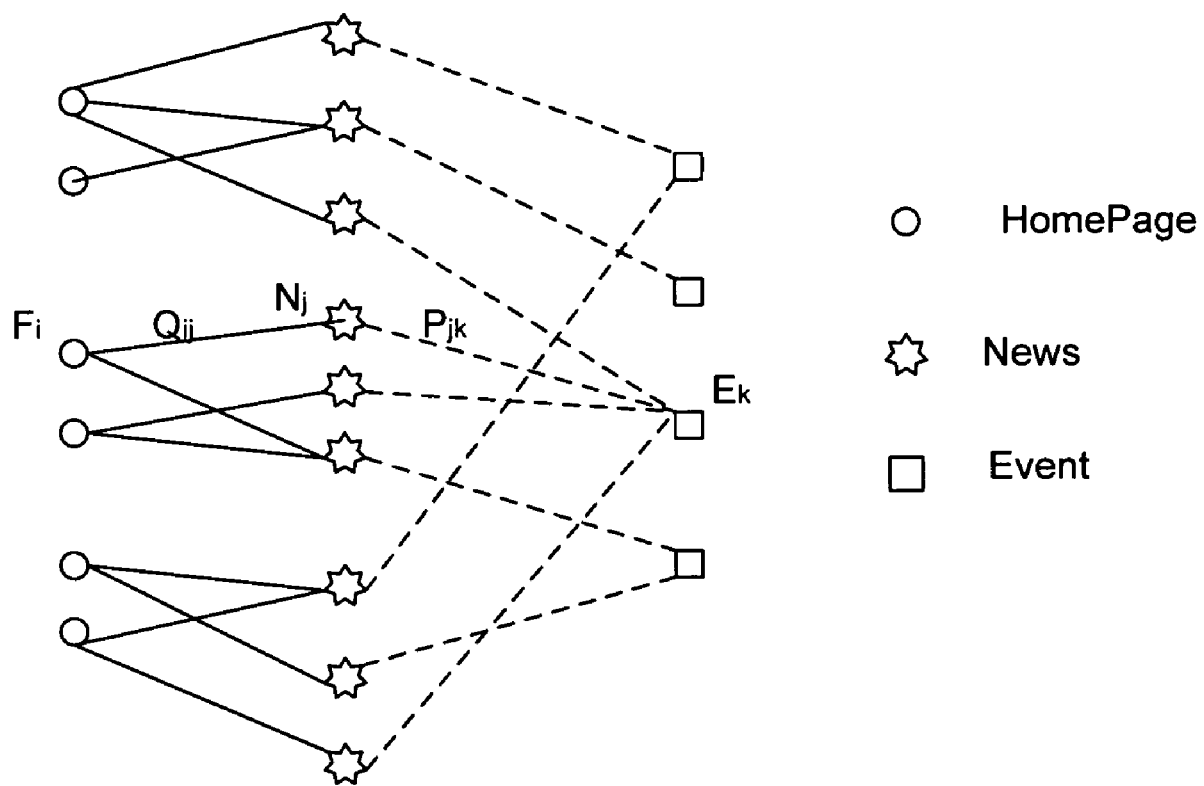
FIG. 1 is a diagram illustrating the tripartite graph.

A method and system for determining the importance of news events based on news reports published by news sources on news home pages is provided. In one embodiment, a news system identifies news home pages that contain references to news reports on detail pages. The news system calculates the importance of a news event based on the importance of news reports reporting that news event. An example news event may be the passage of a certain bill by Congress, and news reports would be the detail web pages of news sources (e.g., "MSNBC.com") reporting on the passage of the bill. The news system may determine the importance of a news report using a news home page model that is based on the assumption that credible news home pages recommend important news reports and that important news reports are recommended by credible news home pages. The credibility of a news home page is a measure of the degree to which the strength of recommendations of news reports by a news home page reflects the importance of the reported news events. The recommendation strength of a news report by a news source (or its news home page) is an indication of the importance that the news source places on the reported news event. For example, if a news source displays a reference to a news report in a prominent position (e.g., at the top and in the middle) on its news home page, then the news source believes that the news event is important. If a news home page prominently displays a news report for a news event that is not reported by any other news home page, then the credibility of that news home page (and its news source) may be reduced. The news system may recursively define the credibility of a news home page based on the importance of its news reports and the importance of news reports based on the credibility of their news home pages. The news system may iteratively calculate the credibility of the news home pages and the importance of the news reports until they converge on a solution. The news system may then assume that the most important news reports report on the most important news events.

In an alternative embodiment, the news system may determine the importance of a news report using a similarity model that is based on the assumption that important news events are reported by more news reports and that important news reports report important news events. The news system may determine the similarity between news reports (e.g., based on a tf*idf metric) and use that similarity as an indication that news reports report the same news event. The news system may recursively define the importance of a news report based on the importance of its news event and the importance of the news event based on the importance of the reporting news reports. The news system may iteratively calculate the importance of the news reports and the importance of the news events until they converge on a solution giving the most important news events and news reports.

In an alternative embodiment, the news system may combine the news home page and similarity models to identify the most important news events. In particular, the news system may determine the importance of a news report using a combined model that is based on the assumption that the importance of a news report is based on credibility of news home pages and the importance of similar news reports. The news system may recursively define the importance of a news report based on the credibility of news home pages and the similarity to other news pages and the importance of a news home page based on the importance of its news reports and similar news reports. The news system may iteratively calculate the importance of the news reports and news home pages and use the importance of the news reports to indicate the importance of the reported news events.

In one embodiment, the news system may aggregate news reports for important news events collected from various news home pages and provide an aggregate home page. To provide the aggregate home page, the news system may periodically crawl news home pages and identify important news events based on the importance of news reports. The news system may also identify a news report that is representative of each important news event. For example, the news system may select the most important news report that reports that news event. When the news system receives a request for the aggregate home page, the news system retrieves an indication of the news reports that are representative of the important news events and generates an aggregate home page with links to the news reports. The news system may also use clustering techniques to identify related news events and group them together on the aggregate home page. In this way, the news system provides a single aggregate home page through which a user can access news reports for important news events.

In one embodiment, the news system models news home pages, news reports, and news events as a tripartite graph. The news system represents the graph as a five-tuple $G=\{F,N,E,Q,P\}$, where $F=\{F_1 \ldots F_m\}$, $N=\{N_1 \ldots N_n\}$, and $E=\{E_1 \ldots E_d\}$ represent three sets of vertices corresponding to news home pages, news reports, and news events. A matrix Q is defined on F×N such that $Q_{ij}$ represents the recommendation strength of $N_j$ by $F_i$. The news system may assume that the maximum recommendation strength is equal for all news home pages. Thus, the news system may normalize matrix Q along rows so that $$\forall i, \max_j Q_{ij} = 1.$$

A matrix P is defined on N×E such that $P_{ij}$ is the probability that news report $N_i$ reports news event $E_j$. The sum of the probabilities of a row is 1, that is, $$\forall i, \sum_j P_{ij} = 1.$$

FIG. 1 is a diagram illustrating the tripartite graph. The news system normalizes the credibility weight $w_i^f$ for each news home page $F_i$, importance weight $w_i^n$ for each news report $N_i$, and importance weight $w_i^e$ for each news event $E_i$ according to the following formulas:

$$\sum_{i=1}^{m} (w_i^f)^2 = 1, \quad (1)$$

$$\sum_{i=1}^{d} (w_i^e)^2 = 1,$$

$$\sum_{i=1}^{n} (w_i^n)^2 = 1$$

In the news home page model, the news system may assume that importance of a news report increases with the credibility of the news home pages referencing related news reports and with the recommendation strength of its news home pages. The news system may define the importance weight of a news report and the credibility weight of a news home page according to the following:

$$w^n \leftarrow Q^T \times w^f \quad (2)$$

$$w^f \leftarrow K_q \times Q \times w^n \quad (3)$$

where $K_q$ is a diagonal matrix and $$K_q(i, i) = 1 \bigg/ \sum_j Q_{ij}^2.$$

The matrix $K_q$ is used to normalize the credibility of news home pages based on the number of news reports that are referenced. In particular, the credibility of a news home page should not be increased or decreased simply because of the number of references to news reports. Thus, when the importance of news reports is given, the news system estimates the credibility of a news homepage as the following:

$$w_i^f = \frac{\sum_j Q_{ij} w_j^n}{\sum_j Q_{ij}^2} \quad (4)$$

In one embodiment, the news system may solve for $w^n$ and $w^f$ by iteratively calculating Equations 1 and 2. The solution for $w^f$ converges to $w^{f*}$, which is the unit principal eigenvector of $K_q \times Q \times Q^T$, and the solution for $w^n$ converges to $w^{n*}$, which is the unit principal eigenvector of $Q^T \times K_q \times Q$ and is proportional to $Q^T \times w^{f*}$. The news home page model may, however, not effectively calculate the relative credibility of the home pages. In particular, because the credibility is based on news reports that are typically reported by only one home page, this model provides no connection between home pages reporting the same news events.

In the similarity model, the news system may assume that the importance of a news event increases with the importance of its reporting news reports and the importance of a news report increases with the importance of its reported news events. The news system may define the importance weight of a news report and the importance weight of a news event according to the following:

$$w^n \leftarrow P \times w^e \quad (5)$$

$$w^e \leftarrow P^T \times w^n \quad (6)$$

In one embodiment, the news system may solve for $w^n$ and $w^f$ by iteratively calculating Equations 3 and 4 in a manner similar to that for Equations 1 and 2. The similarity model may, however, not effectively calculate the importance of news events under certain circumstances. In particular, if a set of news reports that report news events on the same topic (e.g., a topic such as congressional activity is broader than a news event such as passing a bill) are similar but news reports for other news events are not similar, then every news event with that topic will have a higher importance than other news events. A similar limitation was described in Kleinberg, J. M., "Authoritative Sources in a Hyperlinked Environment," Journal of the ACM, Vol. 46, No. 5, pp. 604-622, 1999.

In one embodiment, the news system combines the news home page model and the similarity model into a combined model when determining the importance of each news event. The news system combines the model as follows:

$$w^n \leftarrow A \times w^n \leftarrow A \times Q^T \times w^f \quad (7)$$

$$w^f \leftarrow K_q \times Q \times w^n \quad (8)$$

In one embodiment, the news system may solve for $w^n$ and $w^f$ by iteratively calculating Equations 5 and 6 in a manner similar to that for Equations 1 and 2.

In one embodiment, the news system monitors a set of news sources and crawls their news home pages at a certain frequency (e.g., hourly). The news system stores the news home pages and their referenced news reports in a database. The news system may identify important news events either on a periodic basis or when requested by a user. In either case, the news system identifies from the database representative news reports for most important news events and creates an aggregate news home page. The news system may use clustering techniques to group related events on the aggregate news home page.

In one embodiment, the news system determines the recommendation strength of a news home page for a news report based on the prominence with which it displays the reporting news report. Since the recommendation strength may change over time, the news system analyzes a set of snapshot news home pages $\{S_{t_1}, S_{t_2}, \ldots\}$ where snapshot $S_t$ denotes the news home page at time t. The news system may summarize all snapshots of a news home page over time to determine the recommendation strength.

Figure 2:
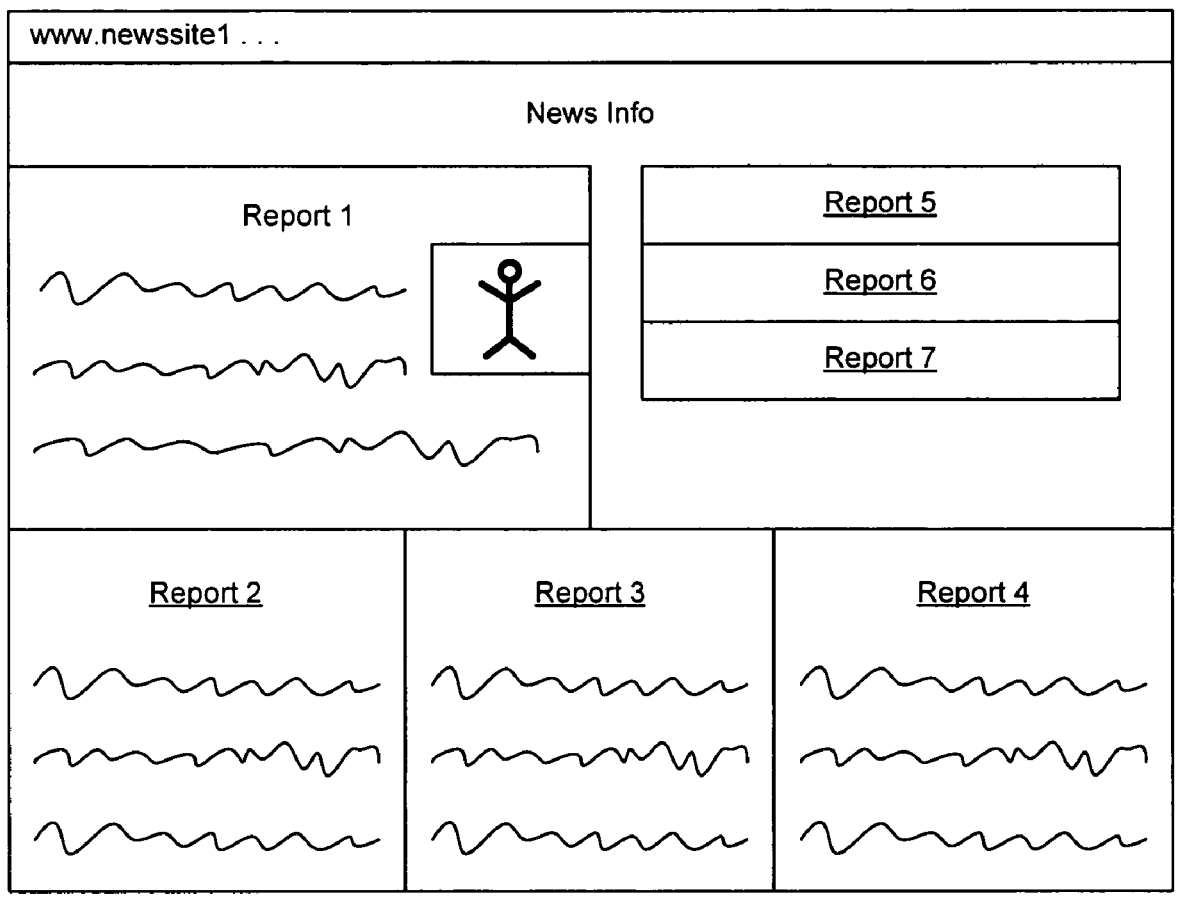
FIG. 2 illustrates a news home page with the blocks identified.
Figure 3:
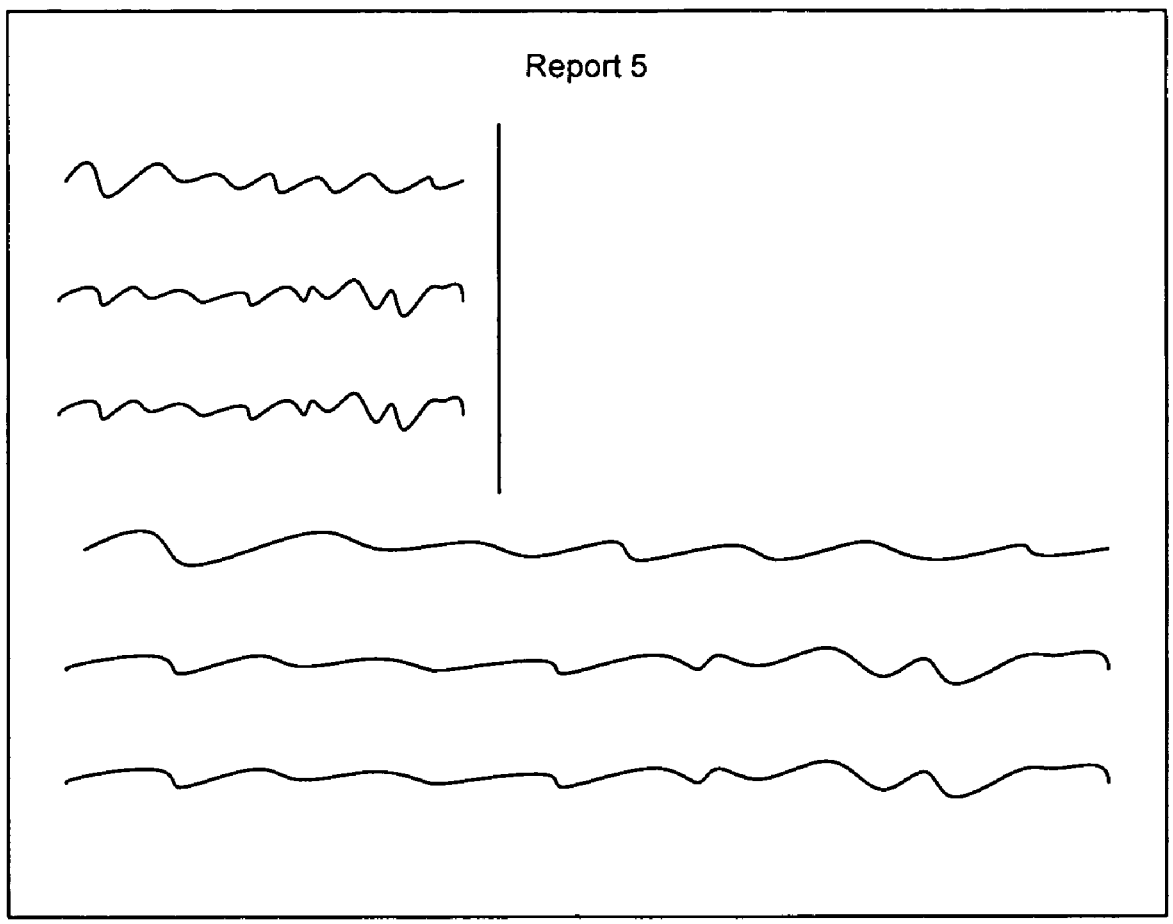
FIG. 3 illustrates a news report page.
Figure 4:
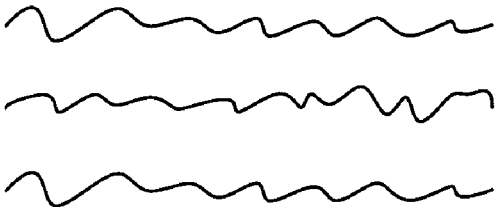
FIG. 4 illustrates an aggregate news page.

In one embodiment, the news system uses a vision-based page segmentation algorithm to analyze the content structure as described in Cai, D., Yu, S., Wen, J., and Ma, W., "VIPS: A Vision-based Page Segmentation Algorithm," Microsoft Technical Report, MSR-TR-2003-79, 2003. The news system divides each snapshot into a set of blocks such that each block is dominated by a hyperlink and removes those hyperlinks that do not reference a news report. The news system may use various heuristics to determine whether a hyperlink references a news event. For example, the news system may determine that a link with the text "Contact Us" does not reference a news report. FIG. 2 illustrates a news home page with the blocks identified. Each framed rectangle identifies a block in which one news report dominates. The blocks are identified as "report1" through "report7." FIG. 3 illustrates a news report page. The hyperlink "report5" of FIG. 2 references the news report of FIG. 3. FIG. 4 illustrates an aggregate news page. The aggregate news page contains references to news reports published by various news home pages.

In one embodiment, the news system determines the prominence of a block based on its size and position, and whether it contains an image. The news system may represent the prominence as follows:

$$q(S,N) = \text{BlockSize}/\text{MaxBlockSize} + (1 - \text{top}/\text{Page-Height}) + 0.5 * (\text{ContainImage}!1:0) \quad (9)$$

where q (S,N) represents the prominence of the block of news report N in snapshot S, BlockSize represents the size of the block, top represents the top position of the block, ContainImage represents whether the block contains an image, BlockSize/MaxBlockSize represents the maximum size of all blocks in the snapshot, and PageHeight represents the height of the snapshot. One skilled in the art will appreciate that a variety of different techniques may be used to determine the prominence of news reports. For example, the prominence may be based on color or animation used within the block. Also, a news home page may contain metadata that explicitly provides the recommendation strength of the news source for each news report. Such metadata may be advantageously provided by a news source that provides news reports for web page providers to link to without necessarily providing a news home page for the news source itself.

As mentioned above, the prominence of a news report may change over time. The news system may summarize the prominence of snapshots based on the intent of the user. For example, if a user wants to browse important news events during a week, then the news system may weight all snapshots during that week equally. If the user wants to browse only current news events, then the news system may weight recent snapshots more than older snapshots. The news system may determine weight for the snapshots according to the following:

$$w(S_t) = \begin{cases} 1, & \text{for the first case} \\ \dfrac{1}{1 + e^{a(t-t_0)}}, & \text{for the second case} \end{cases} \quad (10)$$

where a and $t_0$ represent parameters to control weight over time. The news system may calculate the prominence of a news report for a news home page as the weighted average of the prominence for each snapshot from the news home page. This calculation may be represented by the following:

$$q(F, N) = \dfrac{\sum_{S_t} w(S_t) * q(S_t, N)}{\sum_{S_t} w(S_t)} \quad (11)$$

The news system may normalize the prominence q (F,N) so that the maximum prominence of each news home page is one.

In one embodiment, the news system calculates the similarity between news reports using a Vector-Space Model ("VSM"). The news system considers news reports that reference the same "name entities" (e.g., "Bill Clinton") as more similar than news reports that just happen to use the same general term (e.g., "passed"). The news system may use natural language processing ("NLP") techniques to identify the name entities of a news report and uses stemming to identify the general terms. The news system may also consider visual aspects such as the font size and highlighting (e.g., bold) of a term as an indication of increased relevance of the term to the news report. The news system may use a term frequency and inverse document frequency ("tf-idf") metric to calculate relevance as indicated by the following.

$$w(N, e) = \begin{cases} idf_e * \sum_{w \in N \text{ and } w=e} f_N(w), & \text{if } e \text{ is a feature word} \\ idf_e * \sum_{w \in N \text{ and } w=e} f_N(w) * 5, & \text{if } e \text{ is a name entity} \end{cases} \quad (12)$$

where w (N,e) represents the weight of term e in news report N, $idf_e$ represents the inverse document frequency for term e, and $f_N(w)$ represents the weight of visual aspects of each word w in N. The news system calculates the similarity of two news reports using a cosine function on the term vectors. One skilled in the art will appreciate that the similarity between news reports may be determined using a variety of well-known techniques that may include classification techniques, clustering techniques, and so on.

Figure 5:
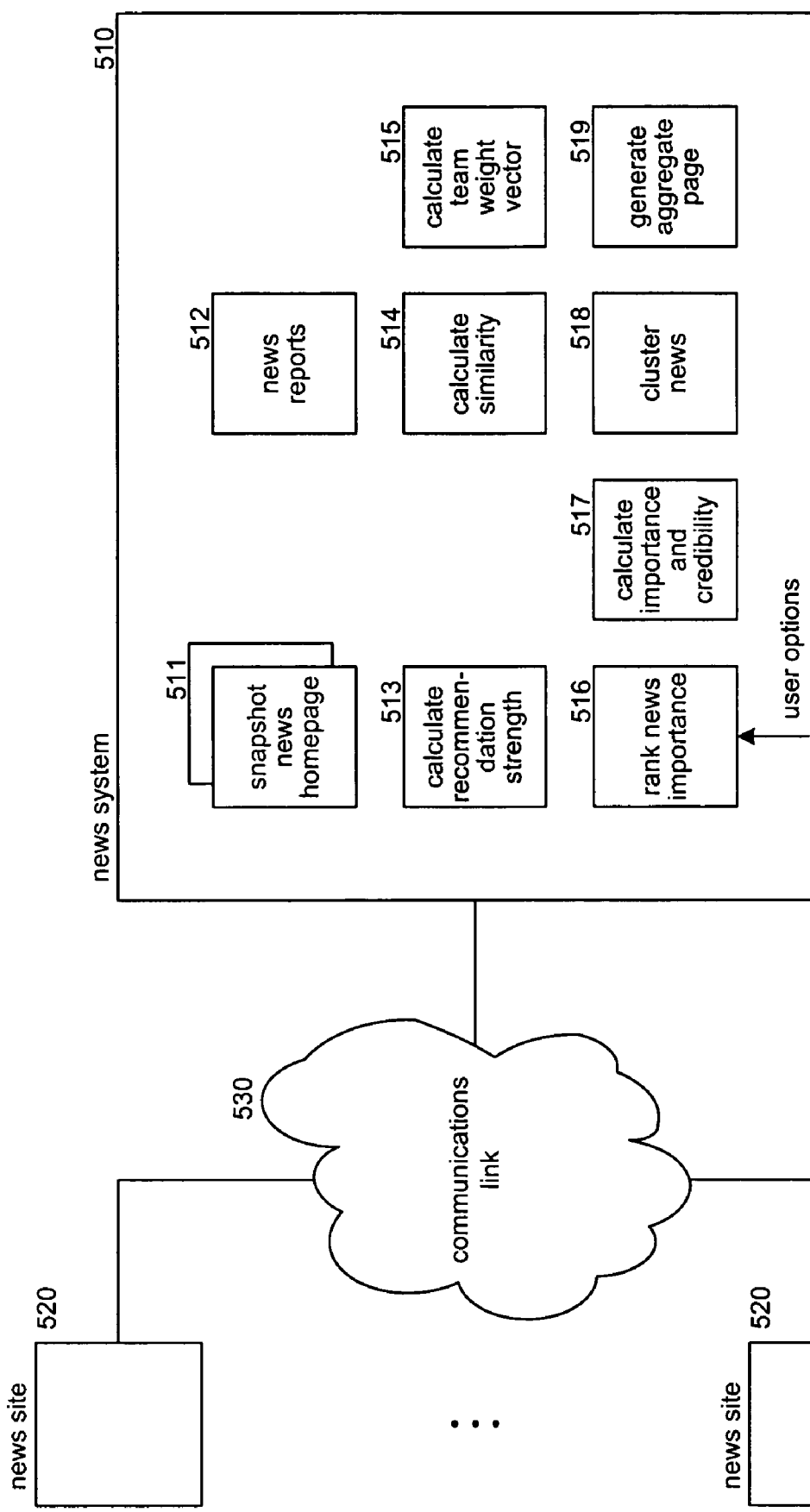
FIG. 5 is a block diagram that illustrates components of the news system in one embodiment.

FIG. 5 is a block diagram that illustrates components of the news system in one embodiment. The news system 510 is connected to various news sites 520 via communications link 530. The news system includes a snapshot news home page store 511 and a news report store 512. The snapshot news home page store contains snapshots of the news home pages of the news sites that are crawled by the news system. The news report store contains the news reports referenced by the snapshots. The news system also includes a calculate recommendation strength component 513, a calculate similarity component 514, and a calculate term weight vector component 515. The calculate recommendation strength component determines the recommendation strength of a news home page for a news report based on the prominence of the news report. The calculate similarity component calculates the similarity between news reports by invoking the calculate term weight vector component for each news report and determining the cosine for the term weighting vectors. The news system also includes a rank news importance component 516, a calculate importance and credibility component 517, a cluster news component 518, and a generate aggregate page component 519. The rank news importance component ranks news events based on the importance of their reporting news reports. The calculate importance and credibility component calculates the importance of the news reports and the credibility of news home pages using Equations 5 and 6. The cluster news component clusters news events so that the aggregate page can group news reports for related news events. The generate aggregate page component selects the highest-ranking news events and adds links to representative news reports to an aggregate page.

The computing devices on which the news system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the news system. In addition, the data structures may be stored or transmitted via a data transmission medium, such as a signal on a communications link. Various communications links may be used to connect components of the system, such as the Internet, a local area network, a wide area network, a point-to-point dial-up connection, a cell phone network, and so on.

Embodiments of the news system may be implemented in various operating environments that include personal computers, server computers, hand-held or laptop devices, multiprocessor systems, microprocessor-based systems, network PCs, minicomputers, mainframe computers, distributed computing environments that include any of the above systems or devices, and so on.

The news system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 6:
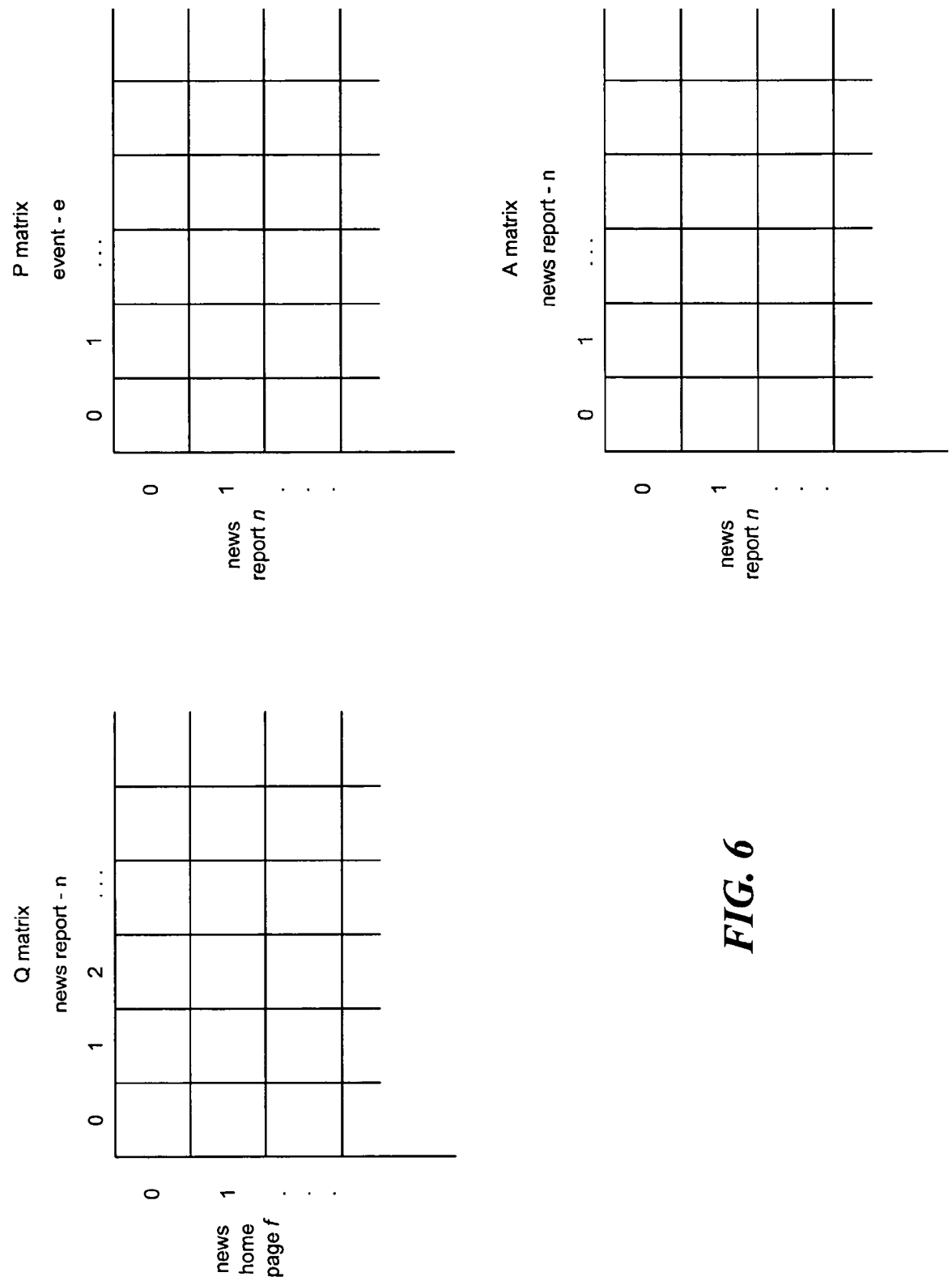
FIG. 6 is a diagram that illustrates various data structures used by the news system in one embodiment.

FIG. 6 is a diagram that illustrates various data structures used by the news system in one embodiment. The news system uses the matrix Q to indicate for each news home page the recommendation strengths of its news reports. The matrix Q contains a row for each news home page in a column for each news report. Each entry contains the recommendation strength. The news system uses the matrix P to indicate which news reports report which news events. The matrix P contains a row for each news report and a column for each news event. Each entry contains the probability that the news report is reporting on that news event. The matrices Q and P represent the tripartite graph of news home pages, news reports, and news events. The news system uses matrix A to indicate the similarity between news reports. The matrix A contains a row and a column for each news report and may be generated from matrix P. Each entry indicates the similarity between the news reports.

Figure 7:
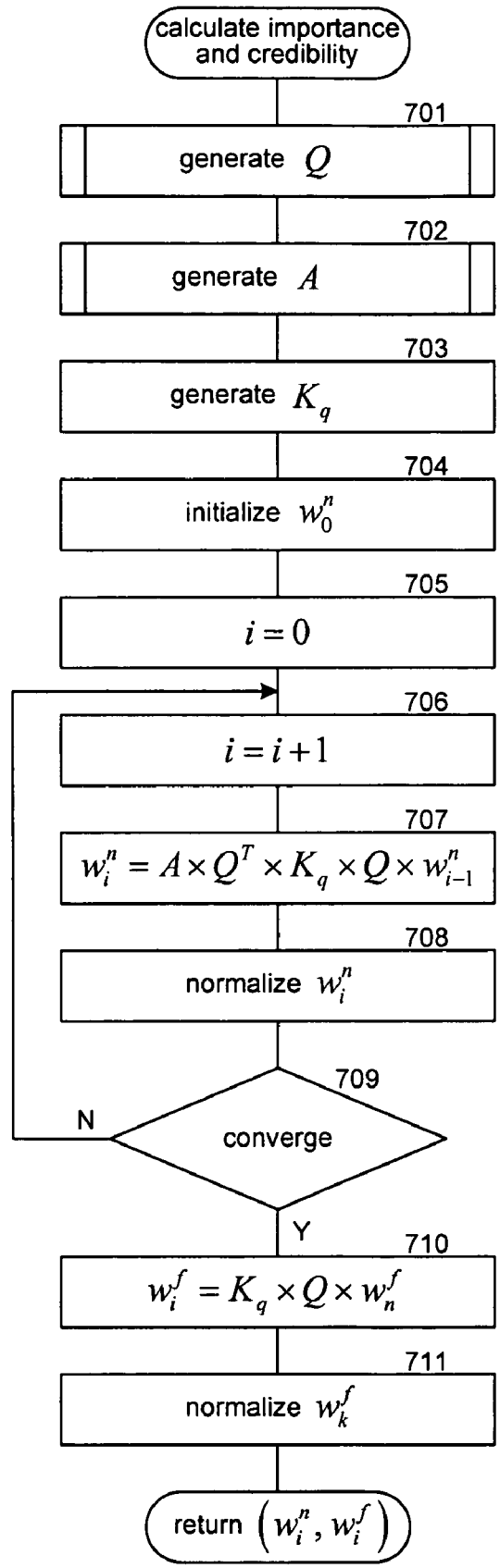
FIG. 7 is a flow diagram that illustrates the processing of the calculate importance and credibility component of the news system in one embodiment.

FIG. 7 is a flow diagram that illustrates the processing of the calculate importance and credibility component of the news system in one embodiment. The component calculates the importance of each news report and the credibility of each news home page. In block 701, the component invokes the generate Q matrix component to generate the matrix Q. In block 702, the component invokes the generate A matrix component to generate the matrix A. In block 703, the component invokes the generate $K_q$ matrix to generate the matrix $K_q$. In block 704, the component initializes the weights for the importance of the news reports. In blocks 705-709, the component loops calculating Equations 5 and 6 until the importance weights converge or some other termination condition (e.g., number of iterations) is met. In block 705, the component initializes the iteration count. In block 706, the component increments the iteration count. In block 707, the component calculates the importance weight for each news report for the current iteration. In block 708, the component normalizes the importance weights. In decision block 709, if the normalized importance weights converge, then the component continues at block 710, else the component loops to block 706 to start the next iteration. In block 710, the component calculates the credibility weights for the news home pages. In block 711, the component normalizes the credibility weights. The component then returns the importance weights of the news reports and the credibility weights of the news home pages.

Figure 8:
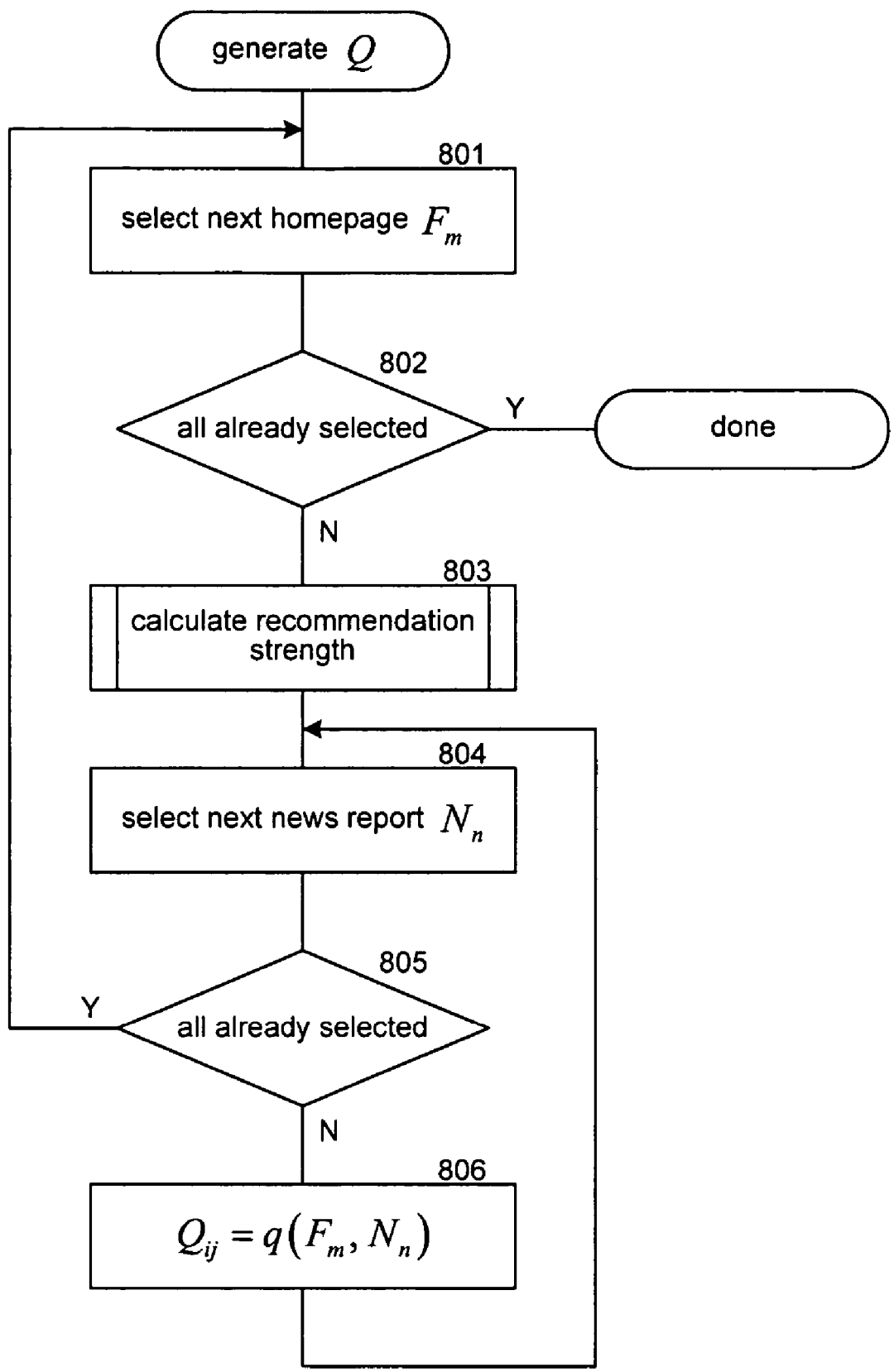
FIG. 8 is a flow diagram that illustrates the processing of the generate Q matrix component of the news system in one embodiment.

FIG. 8 is a flow diagram that illustrates the processing of the generate Q matrix component of the news system in one embodiment. The component generates the matrix Q based on the data of the snapshot news home page store and the news report store. In block 801, the component selects the next news home page. In decision block 802, if all the news home pages have already been selected, then the component completes, else the component continues at block 803. In block 803, the component invokes the calculate recommendation strength component to calculate the recommendation strength of each news report on the selected news home page. In blocks 804-806, the component loops setting the recommendation strength of each news report for the selected news home page. In block 804, the component selects the next news report. In decision block 805, if all the news reports have already been selected, then the component loops to block 801 to select the next news home page, else the component continues at block 806. In block 806, the component sets the recommendation strength of the selected news report for the selected news home page and then loops to block 804 to select the next news report.

Figure 9:
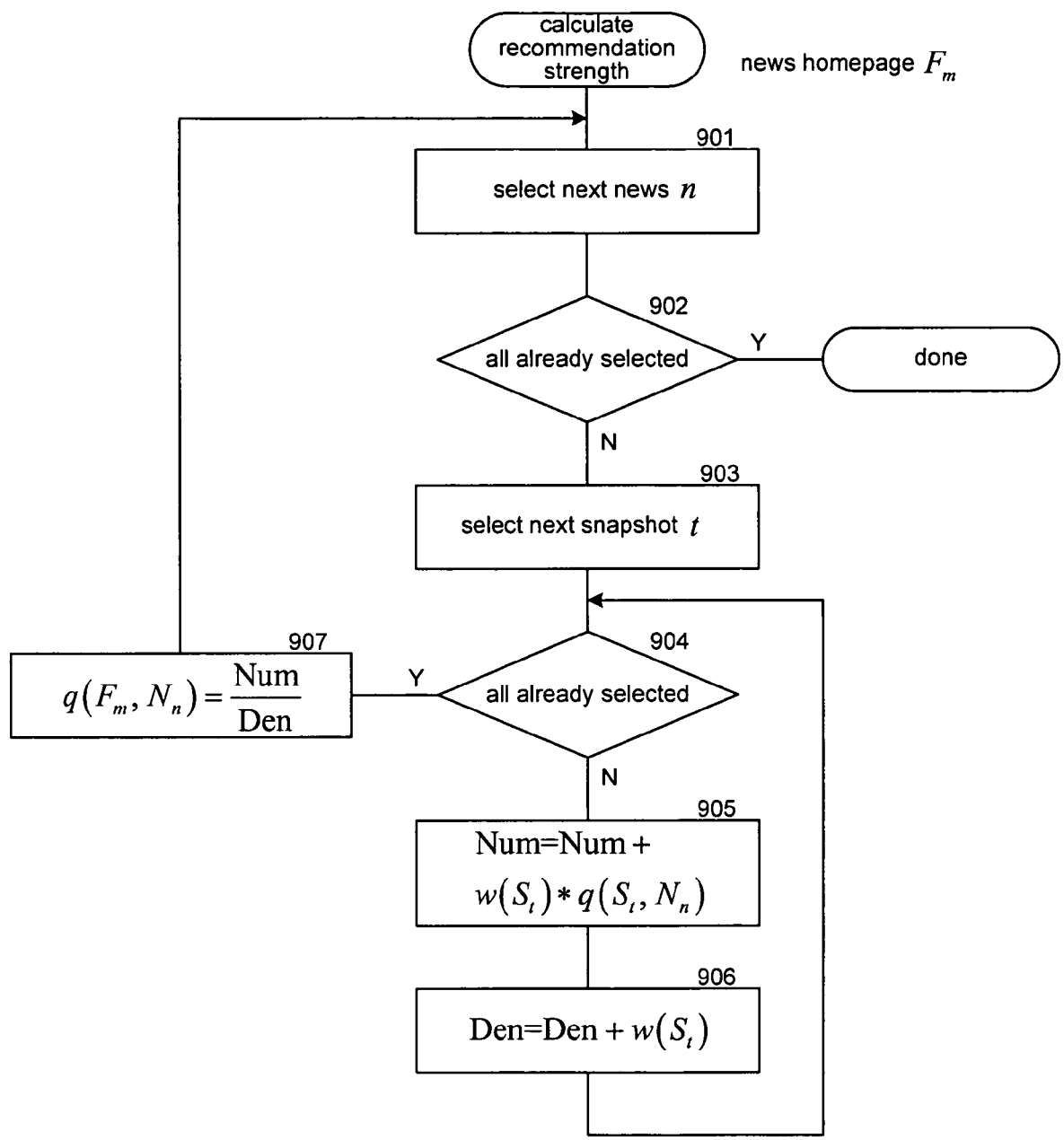
FIG. 9 is a flow diagram that illustrates the processing of the calculate recommendation strength component of the news system in one embodiment.

FIG. 9 is a flow diagram that illustrates the processing of the calculate recommendation strength component of the news system in one embodiment. The component calculates the recommendation strength of news reports to a news home page based on the visual prominence of the snapshots of the news home page. In block 901, the component selects the next news report for the news home page. In decision block 902, if all the news reports have already been selected, then the component completes, else the component continues in block 903. In blocks 903-906, the component loops calculating the weighted average of the prominence of the selected news report. In block 903, the component selects the next snapshot. In decision block 904, if all the snapshots have already been selected, then the component continues at block 907, else the component continues in block 905. In block 905, the component accumulates the numerator for the calculation. In block 906, the component accumulates the denominator for the calculation and loops to block 903 to select the next snapshot. In block 907, the component sets the recommendation strength weight to the numerator divided by the denominator and loops to block 901 to select the next news report.

Figure 10:
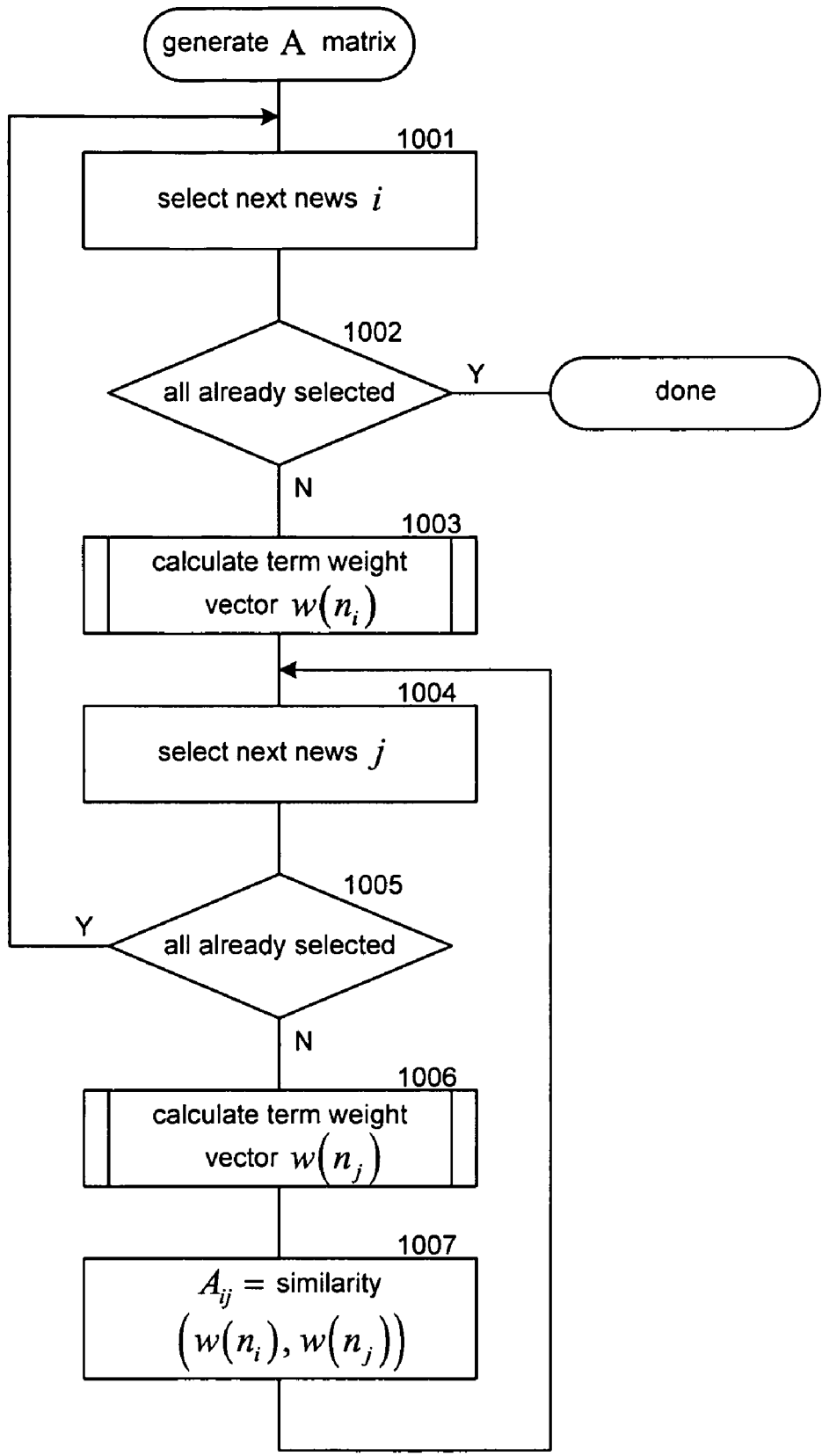
FIG. 10 is a flow diagram that illustrates the processing of the generate A matrix component of the news system in one embodiment.

FIG. 10 is a flow diagram that illustrates the processing of the generate A matrix component of the news system in one embodiment. The component generates the matrix A that contains the probabilities that two news reports report on the same news event. In block 1001, the component selects the next news report. In decision block 1002, if all the news reports have already been selected, then the component completes, else the component continues at block 1003. In block 1003, the component invokes the calculate term vector weight component to calculate the term weight vector for the selected news report. In blocks 1004-1007, the component loops choosing each news report and determining its similarity to the selected news report. In block 1004, the component chooses the next news report. In decision block 1005, if all the news reports have already been chosen, then the component loops to block 1001 to select the next news report, else the component continues at block 1006. In block 1006, the component invokes the calculate term weight vector component to calculate the term weight vector for the chosen news report. In block 1007, the component calculates the similarity between the selected and chosen news reports and loops to block 1004 to choose the next news report.

Figure 11:
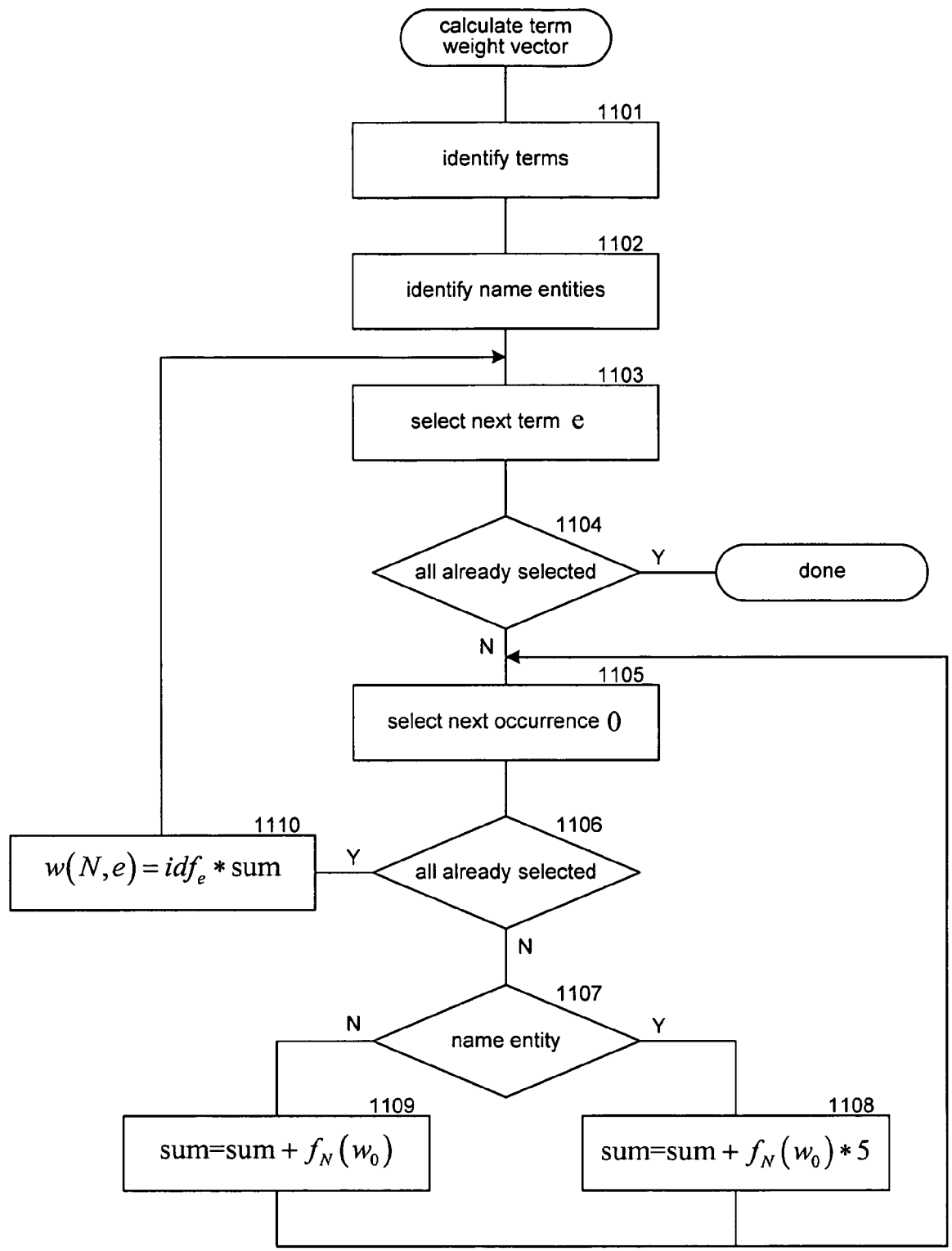
FIG. 11 is a flow diagram that illustrates the processing of the calculate term weight vector component of the news system in one embodiment.

FIG. 11 is a flow diagram that illustrates the processing of the calculate term weight vector component of the news system in one embodiment. The component generates a term weight vector for the news report. In block 1101, the component identifies the terms of the news report. In block 1102, the component identifies the name entities of the news report. In blocks 1103-1110, the component loops setting the term weight for each term of the news report. In block 1103, the component selects the next term of the news report. In decision block 1104, if all the terms have already been selected, then the component completes, else the component continues at block 1105. In blocks 1105-1110, the component loops aggregating the weight for each occurrence of the selected term. In block 1105, the component selects the next occurrence of the selected term. In decision block 1106, if all the occurrences have already been selected, then the component continues at block 1110, else the component continues at block 1107. In decision block 1107, if the selected term is a name entity, then the component continues at block 1108, else the component continues at block 1109. In block 1108 and block 1109, the component accumulates the weights for the name entities and general terms, respectively. The component then loops to block 1105 to select the next occurrence of the selected term. In block 1110, the component sets the weight for the selected term to the accumulated sum times the inverse document frequency for the selected term and then loops to block 1103 to select the next term.

From the foregoing, it will be appreciated that specific embodiments of the invention have been described herein for purposes of illustration, but that various modifications may be made without deviating from the spirit and scope of the invention. For example, the news system may be used to determine the importance of reports and events that may not be considered "news." For example, the system may be used to collect and determine the importance of medical reports relating to important medical conditions, rather than events. Also, the news system may allow the user to provide parameters for filtering the topics of the news events that are reported. For example, a user may want to limit the news reports to those reporting on "sport" events. Accordingly, the invention is not limited except as by the appended claims.

We claim:

1. A computer-readable storage medium containing instructions for controlling a computing device to determine importance of news events, by a method comprising:
    crawling news home pages of web sites to identify news reports reporting news events;
    calculating importance weights of the identified news reports reporting news events based on credibility of the crawled news home pages, the credibility of a news home page based on the importance weights of news reports that are referenced by the news home page, the calculating of the importance weight including calculating a credibility weight of each news home page based on importance weights of news reports reported by a news home page and the importance weight of each news report based on the credibility weight of the news home page that reports the news report, wherein the importance weight of a news report is defined recursively based on the credibility weight of the news home page that reports the news report and the credibility weight of a news home page is defined recursively based on the importance weight of the news reports that it reports; and
    identifying the importance of a news event is based on importance weight of news reports reporting the news event.

2. The computer-readable medium of claim 1 wherein the importance of a news report is based on importance weights of similar news reports.

3. The computer-readable medium of claim 2 wherein the similarity between news reports is based on similarity of term vectors for the news reports generated using a term frequency by inverse document frequency metric.

4. The computer-readable medium of claim 2 wherein the similarity between news reports is based on similarity of term vectors for the news reports that weight name entities more that non-name entities.

5. The computer-readable medium of claim 1 wherein the calculating is according to the following:

$$w_i^n = A \times Q^T \times K_q \times Q \times w_{i-1}^n$$

where Q represents a recommendation strength matrix, A represents a news report similarity matrix, $K_q$ represents a normalization matrix, and $w_i^n$ represents the importance weight of the news reports for the i th iteration.

6. The computer-readable medium of claim 5 including calculating the credibility weight of news home pages according to the following:

$$w_k^f = K_q \times Q \times w_n^f$$

where $w_k^f$ represents the credibility weight of a news home page.

7. The computer-readable medium of claim 1 including:
    generating an aggregate page that contains references to news reports with an importance that is high; and
    providing the aggregate page for display to a user as an aggregation of important news reports.

8. The computer-readable medium of claim 1 including:
identifying a news report from a plurality of news reports that relate to a news event to represent the news event.

9. A computing device with a processor for determining importance of news events, the computing device comprising:
a component that calculates recommendation strength of a news report by its news home page;
a component that calculates similarity between news reports;
a component that calculates importance of news reports based on recommendation strength of a news report by its news home page, similarity between news reports, and a credibility weight of the news home page that references the news report, the credibility weight of each news home page being based on importance weights of news reports reported by the news home page and importance weight of each news report being based on the credibility weight of the news home page that reports the news report, wherein the importance weight of a news report is defined recursively based on the credibility weight of the news home page that reports the news report and the credibility weight of a news home page is defined recursively based on the importance weight of the news reports that it reports; and
a component that calculates importance of a news event based on importance weights of news reports that report the news event.

10. The computing device of claim 9 wherein the credibility weight of a news home page is based on importance weights of news reports that the news home page references.

11. The computing device of claim 9 wherein news reports report the same news event based on similarity between the news reports.

12. The computing device of claim 9 wherein the similarity between news reports is based on similarity of term vectors for the news reports generated using a term frequency by inverse document frequency metric.

13. The computing device of claim 9 wherein the similarity between news reports is based on similarity of term vectors for the news reports that weight name entities more that non-name entities.

14. The computing device of claim 9 including:
generating an aggregate page that references news reports reporting important news events.

15. The computing device of claim 9 including:
identifying a news report from a plurality of news reports that report a news event to represent the news event.

16. A method performed by a computing device for determining importance of a news event, the method comprising:
providing pages having references to news reports reporting the news event;
calculating recommendation strength of a news report to a page that contains a reference to the news report;
calculating similarity between news reports;
calculating importance of news reports based on recommendation strength of a news report by a page, similarity between news reports, and a credibility weight of a page that references a news report, the credibility weight of each page that references a news report being based on importance weights of news reports reported by the page and importance weight of each news report being based on the credibility weight of the page that reports the news report, wherein the importance weight of a news report is defined recursively based on the credibility weight of the page that reports the news report and the credibility weight of a page is defined recursively based on the importance weight of the news reports that it reports;
identifying news reports that report on a certain news event; and
determining importance of the certain news event based on the importance of the identified news reports.

17. The method of claim 16 wherein the calculating of the importance of a news report is based on credible pages referencing important news reports and important news reports being referenced by credible pages.

18. The method of claim 16 including selecting a news report from the identified news reports as descriptive of the certain news event.

19. A method in a computing device for generating an aggregate web page that provides an aggregation of news reports for important news events, the method comprising:
crawling news web pages to identify news reports;
calculating a credibility weight of each news web page based on importance weights of news reports reported by a news web page and the importance weight of each news report based on the credibility weight of the news web page that reports the news report, wherein the importance weight of a new report is defined recursively based on the credibility weight of the news web page that reports the news report and the credibility weight of a news web page is defined recursively based on the importance weight of the news reports that it reports;
identifying news reports that report on the same news event;
determining the importance weight of each news event based on the importance weights of news reports identified as reporting on that news event;
selecting news events that are determined to be most important based on their importance weights;
for each selected new event,
selecting a news report that reports on the news event based on the importance weight of the news report; and
adding to the aggregate web page a reference to the selected news report for the news event; and
providing the aggregate web page with the references.

20. The method of claim 19 wherein a new aggregate web pages is generated based on periodic crawling of the news web pages.

21. The method of claim 19 wherein the calculating of credibility weights of news web pages and importance weights of news reports is performed iteratively until a solution is reached.

22. The method of claim 19 wherein the identifying of news report that report on the same news event includes generating a similarity score indicating the similarity between news reports.

23. The method of claim 19 wherein the similarity is calculated using a term-frequency-by-inverse-document metric.

24. The method of claim 19 wherein the importance weight of a news report factors in the similarity of that news report to other news reports.

* * * * *